United States Patent [19]

Gajewski

[11] Patent Number: 4,653,767

[45] Date of Patent: Mar. 31, 1987

[54] SIMPLE BIKE

[76] Inventor: Joseph Gajewski, 9 Spruce St., Jersey City, N.J. 07306

[21] Appl. No.: 805,625

[22] Filed: Dec. 6, 1985

[51] Int. Cl.⁴ ............................................. B62K 13/00
[52] U.S. Cl. ................................... 280/278; 280/287; 403/207; 403/347
[58] Field of Search ............... 280/278, 287, 270, 266, 280/205; 403/207, 347, 361, 379

[56] References Cited

U.S. PATENT DOCUMENTS 1,697,994  1/1929  Moore, Jr. ................... 280/87.04 R
3,220,748  11/1965  Moulton .............................. 280/287
3,437,351  4/1969  St. Clair Newbern ............. 280/205
3,658,354  4/1972  Read ................................ 280/278 X

FOREIGN PATENT DOCUMENTS 233971  6/1964  Austria ................................ 280/287

Primary Examiner—Richard A. Bertsch
Assistant Examiner—Mitchell J. Hill
Attorney, Agent, or Firm—Richard L. Miller

[57] ABSTRACT

A bicycle having a pair of wheels and a frame formed of two crossing bars that are detachable from each other so as to form a separate unicycle and a pedal bike, one of which includes a handle bar at a top, and the other a seat at its top, while each has one wheel at a lower end.

6 Claims, 5 Drawing Figures

U.S. Patent  Mar. 31, 1987  4,653,767
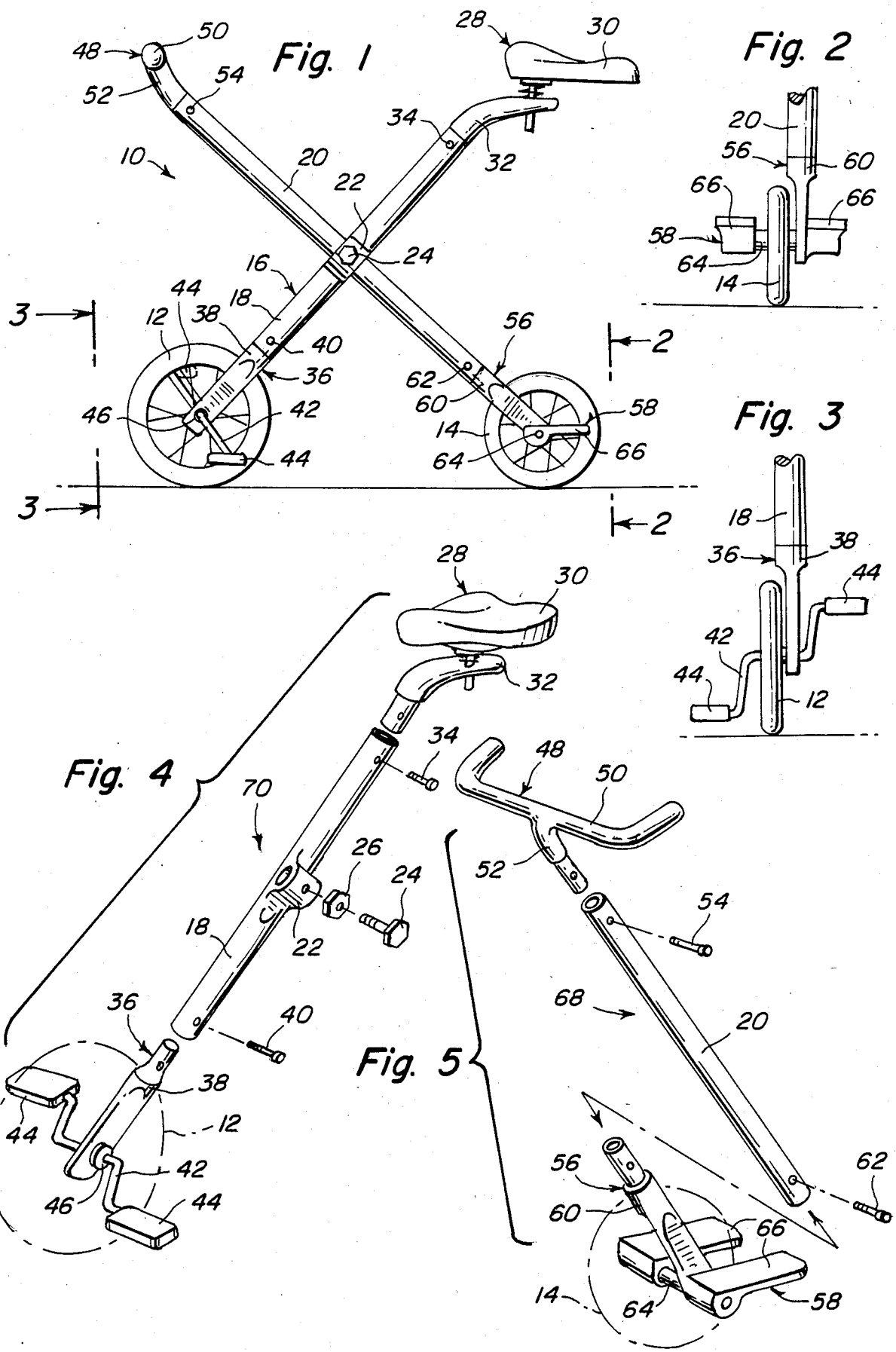

SIMPLE BIKE

BACKGROUND OF THE INVENTION

This invention relates generally to bicycles for a person to ride thereupon. More specifically it relates to a bicycle that is readily convertible so as to form two separate, one-wheeled vehicles, and is an improvement, over, the U.S. Pat. No. 3,362,725 granted to Dolphin; U.S. Pat. No. 3,374,009 to Jeunet; and U.S. Pat. No. 4,460,191 to Ishibashi; all on foldable bicycles. While these patents provide foldable structure for easier storage, the present invention additionally includes structure that is readily possible to be disassembled.

SUMMARY OF THE INVENTION

A principal object of the present invention is to provide a two-wheeled bicycle that can be easily disassembled so as to form a standard, one-wheeled paddle bike and the other a separate unicycle. Another object is to provide a simple bike which when fully assembled serves as a bicycle for an individual, but when disassembled, provides a separate vehicle for each of two friends to use at the same time.

Another object is to provide a simple bike which when disassembled, take up a minimum storage space.

Other objects are to provide a simple bike that is quick and easy to assemble or disassemble, simple in design, rugged in construction, easy to use and efficient in operation.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a side elevational view of the invention shown fully assembled for use as a bicycle.

FIG. 2 is a fragmentary rear elevational view thereof as viewed on line 2—2 of FIG. 1.

FIG. 3 is a fragmentary front elevational view thereof as viewed on line 3—3 of FIG. 3.

FIG. 4 is a perspective view of a first unit of the device, forming a standard peddle bike.

FIG. 5 is a perspective view of a second other unit of the device thereof, forming a separate unicycle.

DETAILED DESCRIPTION OF THE PREFERRED EMBODIMENT

Referring now to the Drawing in greater detail, the reference numeral 10 represents a simple bike, according to the present invention, wherein there is a front wheel 12 and rear wheel 14 supporting a bicycle frame 16 comprised of two straight, crossing bars 18 and 20 assembled together by one being inserted through a collar 22 formed along the other and then being secured by a single detent bolt 24 and nut 26. The bars are made of strong tubular metal so as to be light in weight.

A seat unit 28 is attached to an upper end of the bar 18 and comprises a seat 30 for a rider and which is mounted on a bar 32 inserted into the bar 18 and secured by a detent screw 34.

A front wheel unit 36 on a lower end of the bar 18 includes the wheel 12 and a bar 38 inserted into the bar 18 and secured by a detent screw 40. The wheel is affixed on a crank pedal shaft 42 fitted with foot pedals 44; the shaft being journalled in a bearing 46 of the bar 38.

A "T"-shaped handle bar unit 48 on an upper end of the bar 20 comprises a handle bar 50 with stub shaft 52 inserted in the bar 20 and secured thereto by a detent screw 54.

A rear wheel unit 56 on a lower end of the bar 20 comprises the wheel 14 and a crosshead assembly 58 that includes a bar 60 inserted in bar 20 and secured thereto by detent screw 62. The crosshead assembly also includes a cross shaft 64 affixed transversely to the bar 60. A ball bearing on the cross shaft supports the wheel, and a pair of foot platform 66 are rigidly affixed on the outer ends of the cross shaft for a rider to stand thereupon while holding on to the driver with his hands.

As shown in the Drawing all the detent screws may extend through holes provided in both members that are being held together thereby.

When the simple bike 10 is required to be converted into a unicycle 68 and into a separate standard pedal bike 70 so that two riders each have their own vehicle at a same time, then the bolt 24 is removed so as to separate the bars 18 and 20 from each other, resulting in the two vehicles.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A simple bike, comprising, in combination, a frame and a pair of wheels upon which said frame is supported, said frame comprising a pair of bars crossing into an X-configuration, coupling means for coupling said crossing bars together to form a bike in the assembled condition, said wheels being respectively at the distal ends of said bars with one wheel defining a front wheel and the other wheel defining a rear wheel, a crank foot pedal axially connected through the front wheel, a foot platform axially connected through the rear wheel, said bike disassembling to form two independently operable cycle devices with one bar and said front wheel forming a standard pedal bike and the other bar and said rear wheel forming a separate unicycle.

2. The combination as set forth in claim 1, wherein said frame comprises a pair of crossing, tubular bars, a collar formed integral on one said bar for the other said bar to be inserted removably therethrough.

3. The combination as set forth in claim 2, wherein a seat unit is removably attached on an upper end of a first one said bars.

4. The combination as set forth in claim 3, wherein a handle bar unit is removably attached upon an upper end of a second one of said bars.

5. The combination as set forth in claim 4, wherein one said wheel is removably attached to a lower end of the first said bar, and pedal means are provided for said wheel to form said pedal bike.

6. The combination as set forth in claim 5, wherein the other said wheel is removably attached to a lower end of the second said bar to form said unicycle.

* * * * *